(12) United States Patent
Abella Ferrer et al.

(10) Patent No.: US 9,396,119 B2
(45) Date of Patent: Jul. 19, 2016

(54) DEVICE FOR CONTROLLING THE ACCESS TO A CACHE STRUCTURE

(71) Applicant: BARCELONA SUPERCOMPUTING CENTER, Barcelona (ES)

(72) Inventors: Jaime Abella Ferrer, San Fernando de Maspalomas-Las Palmas (ES); Eduardo Quiñones Moreno, San Fernando de Maspalomas-Las Palmas (ES); Francisco Javier Cazorla Almeida, San Fernando de Maspalomas-Las Palmas (ES)

(73) Assignee: BARCELONA SUPERCOMPUTING CENTER, Barcelona (ES)

( * ) Notice: Subject to any disclaimer, the term of this patent is extended or adjusted under 35 U.S.C. 154(b) by 96 days.

(21) Appl. No.: 14/026,925

(22) Filed: Sep. 13, 2013

(65) Prior Publication Data

US 2014/0082284 A1  Mar. 20, 2014

Related U.S. Application Data

(60) Provisional application No. 61/700,990, filed on Sep. 14, 2012.

(30) Foreign Application Priority Data

Sep. 14, 2012  (EP) .................................... 12184447

(51) Int. Cl.
*G06F 12/08* (2006.01)
*G06F 12/14* (2006.01)

(52) U.S. Cl.
CPC ........ *G06F 12/0864* (2013.01); *G06F 12/1408* (2013.01)

(58) Field of Classification Search
None
See application file for complete search history.

(56) References Cited

U.S. PATENT DOCUMENTS

| | | | |
|---|---|---|---|
| 6,275,919 B1 | 8/2001 | Johnson | |
| 7,366,871 B2 * | 4/2008 | Cypher | G06F 12/0864 711/118 |
| 7,373,480 B2 * | 5/2008 | Cypher | G06F 11/3616 711/118 |
| 7,606,994 B1 * | 10/2009 | Cypher | G06F 12/0864 711/118 |
| 7,743,200 B1 * | 6/2010 | Panwar et al. | 711/3 |

(Continued)

FOREIGN PATENT DOCUMENTS

GB 2412987 A 10/2005

OTHER PUBLICATIONS

Extended European Search Report, EP Application No. EP12184447.6, issued by the European Patent Office, mail date Dec. 11, 2012, pp: 1-4, The Hague, Rijswijk, Netherlands.

(Continued)

*Primary Examiner* — Christopher D Birkhimer
(74) *Attorney, Agent, or Firm* — Peter B. Scull; Hamilton, DeSanctis & Cha LLP (57) ABSTRACT

The present disclosure relates to a device for controlling the access to a cache structure comprising multiple cache sets during the execution of at least one computer program, the device comprising a module for generating seed values during the execution of the at least one computer program; a parametric hash function module for generating a cache set identifier to access the cache structure, the identifier being generated by combining a seed value generated by the module for generating seed values and predetermined bits of an address to access a main memory associated to the cache structure.

13 Claims, 3 Drawing Sheets

(56) References Cited

U.S. PATENT DOCUMENTS

| | | | |
|---|---|---|---|
| 7,937,535 B2* | 5/2011 | Ozer | G06F 12/0822 711/141 |
| 2005/0259819 A1* | 11/2005 | Oomen et al. | 380/200 |
| 2006/0107024 A1* | 5/2006 | Cypher | G06F 11/3616 711/216 |
| 2006/0107025 A1* | 5/2006 | Cypher | G06F 12/0864 711/216 |
| 2006/0206706 A1* | 9/2006 | Dietz | 713/154 |
| 2008/0209133 A1* | 8/2008 | Ozer | G06F 12/0822 711/146 |
| 2010/0023701 A1* | 1/2010 | Chaudhry et al. | 711/137 |
| 2010/0030967 A1* | 2/2010 | Aciicmez et al. | 711/125 |

OTHER PUBLICATIONS

Gonzalez, Antonio et al., "Eliminating cache conflict misses through XOR-based placement functions", In ICS Proceedings of the 11th International Conference on Supercomputing, Jul. 11, 1997, pp. 76-83, ACM, New York, New York.

Seznec, Andre et al., "Skewed-associative caches", Proceedings of the 20th International Symposium on Computer Architecture, May 1993, pp. 1-20, San Diego, California.

Topham, Nigel et al., "Randomized cache placement for eliminating conflicts". IEEE Transactions on Computers, vol. 48, No. 2, Feb. 1999, IEEE, New York, New York.

Cazorla, Francisco et al., "Proartis: Probabilistically analysable real-time systems", INRIA, Jan. 26, 2012, Technical Report No. 7869, pp. 1-33, Centre de recherche INRIA, Le Chesnay Cedex, France.

Griffin, D. et al, "Realism in Statistical Analysis of Worst-Case Execution Times", 10th International Workshop on Worst-Case Execution Time Analysis, Jul. 2010, pp. 1-9, Department of Computer Science, University of York, UK.

Hansen, Jeffery et al., "Statistical-based WCET estimation and validation", Proceedings of the 9th International Workshop on Worst-Case Execution Time (WCET) Analysis, Jan. 2009, pp. 1-11, ECRTS, Carnegie Mellon University, Pittsburgh, PA.

Vandierendonck, Hans, et al., "Randomized caches for power-efficiency", IEICE Transactions on Electronics, Oct. 2003, vol. E86-c, No. 10, pp. 2137-2144, Queen's University, Belfast, Ireland.

Alfke, Peter, "Efficient Shift Registers, LFSR Counters, and Long Pseudo-Random Sequence Generators", Application Note, Xilinx, Jul. 7, 1996, XAPP 052, Version 1.1, 1-6 pgs., Xilinx, Inc., San Jose, California.

"Circular shift" Wikipedia: The Free Encyclopedia. Wikimedia Foundation, Inc., Date modified: Jan 20, 2016, Date accessed: Jan 21, 2016, Web. https://en.wikipedia.org/Wiki/Circular_shift.

Marsaglia, George et al, "A New Class of Random Number Generators", FSU Technical Report #M802, Mar. 1989, 1-21 pages, The Florida State University, Tallahassee, Florida.

Rukhin, Andrew et al, "A Statistical Test Suite for Random and Pseudorandom Number Generators for cryptographic Applications", NIST Special Publication 800-22 Rev 1a, Apr. 2010, 1-131 pages, National Institute of Standards and Technology, Gaithersburg, MD.

\* cited by examiner

DEVICE FOR CONTROLLING THE ACCESS TO A CACHE STRUCTURE

The present disclosure relates to a method for controlling the access to a cache structure including multiple cache sets during the execution of at least one computer program. More specifically, the developments hereof relate to a method capable of guaranteeing that each address accessed by a computer program can have attached a true probability to be allocated to any particular cache set of a cache structure.

Further, the developments hereof also relate to a device and a computer program product for controlling the access to a cache structure suitable for carrying out such a method.

The developments hereof may be applied to real-time systems, for example safety-critical real-time systems such as flight control systems.

BACKGROUND

Caches are generally small, fast storage buffers employable to store information, such as code or data, in order for a program running in a processing device to execute faster. Typically, it is faster for the processing device to read the cache than to read a main memory. Also, with the rapid increase of intensive computational requirements, their importance in a computing system will only increase.

A cache structure is conceptually a matrix of S*W cache lines (conceptually cells) arranged in S sets (conceptually rows) and W ways (conceptually columns). The set (that is, the row) in which a piece of data is placed into cache is determined by the placement policy. The placement policy implements a hash function that uses certain bits of the memory address in which the piece of data is stored to map that piece of data into a specific cache set (row). From the point of view of the cache, different pieces of data can be grouped into cache lines, or simply lines. Since different memory lines can collide into the same cache set, cache sets have a given number of cache lines called ways (that is, columns). All sets have the same number of ways, which determine the associativity of the cache. Hence a W-way set-associative cache has W ways per set. For a given set, the way (cache line) in which a memory line is placed is determined by the replacement policy. On the event of a cache access that turns out to be a miss, the replacement policy selects, among all the ways (columns) in a given set (row), which memory line is evicted to make room for the new memory line. The new memory line is then stored in the cache line whose contents (a memory line) have been just evicted. Each line can be composed by one or several words. The granularity of a word is usually measured in bytes (e.g. 1, 2 or 4 bytes).

The timing behaviour of a cache is mainly determined by its placement and replacement policies. The line size, the word size and other cache parameters may also affect the timing behaviour of the cache. For a given cache configuration both, line size and word size, are fixed.

Randomised caches in high-performance processors have been proposed to remove cache conflicts by using pseudo-random hash functions [A. Gonzalez et al. *Eliminating cache conflict misses through XOR-based placement functions. In ICS*, 1997.][A. Seznec and F. Bodin. *Skewed-associative caches. In PARLE.* 1993.][Nigel Topham and Antonio González. *Randomized cache placement for eliminating conflicts. IEEE Trans. Comput.*, 48, February 1999]. However, the behaviour of all those cache designs is fully deterministic. This means that, whenever a given data input set for a program makes that program generate a pathological access pattern, this pattern will repeat systematically for such input set in all runs of the program. Therefore, although the frequency of pathological cases is reduced, they can still appear systematically because there is no way to prove that their probability is bound.

The real-time domain Probabilistic Timing Analysis (PTA) (see, for example, [F. J. Cazorla et al. *Proartis: Probabilistically analysable real-time systems. Technical Report* 7869 (http://hal.inria.fr/hal-00663329), *INRIA*, 2012], [D. Griffin and A. Burns. *Realism in Statistical Analysis of Worst Case Execution Times. In the* 10*th International Workshop on Worst-Case Execution Time Analysis* (*WCET* 2011), pages 44-53, 2010] or [J. Hansen, S. Hissam, and G. A. Moreno. *Statistical-based WCET estimation and validation. In the* 9*th International Workshop on Worst-Case Execution Time* (*WCET*) *Analysis,* 2009]) has emerged as a promising effective solution to the problems of current WCET analysis techniques, namely, static timing analysis and measurement-based timing analysis.

PTA imposes new requirements on hardware designs. More specifically, the cache design PTA techniques require that the timing behaviour of memory accesses can be defined by the pair of vectors:

$$\{\vec{T}_i, \vec{p}_i\} = \{\{l_i^1, l_i^2, \ldots, l_i^N\}, \{p_i^1, p_i^2, \ldots, p_i^N\}\}$$

where $l_i$ lists all the possible latencies the memory hierarchy can take to serve the data and $p_i$ its associated probability of occurrence. It is noted that probability of occurrence of a given latency is different from its frequency: while frequency provides information about past events, probabilities enable providing guarantees about the occurrence of future events (see, for example, [F. J. Cazorla et al. *Proartis: Probabilistically analysable real-time systems. Technical Report* 7869 (http://hal.inria.fr/hal-00663329), *INRIA,* 2012]). Hence, for the case of a cache resource PTA requires that for each access there is a computable probability of it to hit or miss in cache.

Random replacement policies exist to make random the selection of a cache line (cell) inside a cache set (row). However, existing placement policies are purely deterministic based on the address accessed. Therefore, whether accesses to two different addresses compete for the same cache set depends solely on their particular addresses and the placement function used. Hence, if two addresses are placed into the same cache set at the beginning of the execution, they will collide in that cache set always during the execution of the program and across all runs of the program. Since the behaviour is purely deterministic no true probability can be computed. Hence, the probabilistic properties required by Probabilistic Timing Analysis (PTA) are not fulfilled.

In processor security, standard non-randomised caches are vulnerable to leakage of critical information such as cryptographic keys. Attacks to standard caches rely only on the timing difference between cache hits and misses. Breaking the determinism between accesses and whether they hit or miss by using random-replacement caches or the like, makes hits and misses occur with a given probability, improving security since information is obscured to attackers.

Overall, so far only those caches with one cache set (no placement function required) and a plurality of cache ways implementing random replacement are suitable for PTA techniques and to reduce security vulnerabilities. Unfortunately, those caches, also known as fully-associative caches, are typically expensive in terms of energy and area and do not scale well.

SUMMARY

It is an object of the present developments to provide a device for controlling the access to a cache structure, which avoids one or more of the disadvantages of the prior art.

To achieve the above, according to a first aspect, a device is proposed for controlling the access to a cache structure having multiple cache sets during the execution of at least one computer program, the device including a module for generating seed values during the execution of the at least one computer program; a parametric hash function module for generating a cache set identifier to access the cache structure, the identifier being generated by combining a seed value generated by the module for generating seed values and predetermined bits of an address to access a main memory associated with the cache structure.

In this way, in a cache structure with multiple sets, the provision of the seed value guarantees a given access having true probabilities to be assigned to each of the cache sets of the cache structure regardless of the value of the address. That is, the proposed device is capable of guaranteeing that each address accessed by a computer program, through a processor module such as a microprocessor, can be attached a true probability to be allocated to any particular cache set of a cache structure comprising multiple sets.

It is important to highlight that the generated seed value may be updated either periodically or whenever a particular event occurs. In this way, the seed value may be updated only at the beginning or the end of the execution of the computer program, although updating it at a different time, or with higher or lower frequency is also within the scope hereof.

Consequently, if the seed value is changed, the obtained set identifier also changes for a given fixed address. For the purposes hereof, any parametric hash function module may be used as long as there is a real probability that an address may be mapped to any set. Any seed value may be used. However, a higher degree of randomisation is achieved if the parametric hash function module produces large variations in its output set identifier even if small changes occur in the input address and/or the seed value, and if the seed is set to a random or pseudo-random value.

Further, cache structures with multiple sets implementing placement functions are more convenient in terms of energy. Those cache structures with multiple sets are known as direct-mapped caches if they have only one cache line per set (no replacement policy needed) and as set-associative caches if they have more than one cache line per set (both placement and replacement policies needed).

According to an embodiment hereof, the cache structure may comprise $2^n$ sets, and the generated cache set identifier may comprise n bits.

Preferably, the given address comprises a sequence of bits, a subset of them that may correspond to an offset, and the predetermined set-identifier bits of the address may comprise the sequence of bits without the offset.

According to another embodiment, the cache structure may comprise at least one cache line per set, such as a set-associative cache structure or a direct-mapped cache structure.

According to another embodiment hereof, the module for generating seed values during the execution of at least one computer program may comprise a pseudo-random number generator, which may be implemented either in hardware or in software. For instance, the module for generating seed values may be implemented in hardware by means of electronic elements (e.g. logic gates).

Further, the device may comprise a memory module for storing the generated seed values, so that all the generated seed values may be stored in the memory module. Alternatively, every newly generated seed value may replace the previously generated seed value.

According to another aspect, a method is proposed of controlling the access to a cache structure comprising multiple cache sets during the execution of at least one computer program, the method comprising:
  Generating seed values during the execution of at least one computer program;
  Receiving an address to access a main memory associated to the cache structure;
  Generating a cache set identifier to access the cache structure, the identifier being generated by combining a generated seed value and predetermined bits of the received address.

According to yet another aspect hereof, it is provided a computer program product comprising program instructions for causing a computer to perform the method of controlling the access to a cache structure as described above. Such a computer program product may be embodied on a storage medium (for example, a CD-ROM, a DVD, a USB drive, on a computer memory or on a read-only memory) or carried on a carrier signal (for example, on an electrical or optical carrier signal).

The present disclosure also provides a cache structure comprising multiple cache sets and the device for controlling the access to the cache structure as described above.

Additional objects, advantages and features of embodiments hereof will become apparent to those skilled in the art upon examination of the description, or may be learned by practice of the invention.

BRIEF DESCRIPTION OF THE DRAWINGS

Particular embodiments of the present invention will be described in the following by means of non-limiting examples, with reference to the appended drawings, in which.

DETAILED DESCRIPTION OF EMBODIMENTS

In the following description of preferred embodiments, numerous specific details are set forth to provide a thorough understanding of the present invention. However, those skilled in the art will appreciate that the invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In preferred embodiments, however, the functions are performed by a processor, such as a computer or an electronic data processor, in accordance with code, such as computer program code, software, and/or integrated circuits that are coded to perform such functions, unless indicated otherwise.

Execution of computer programs in a computer system (e.g. a personal computer) relates to the process by which the computer system, through its processor, carries out the instructions of the computer program. Some of these instructions may need to access data stored in a predetermined address of a main memory comprised in the computer system. This way, when the processor tries to access the main memory according to the predetermined address for obtaining the needed data, firstly it verifies if the required data is stored in a cache structure associated to the main memory. This is the reason why a cache structure comprises generally small, fast storage buffers employable to store information, which allows a processor to more quickly and efficiently have access to the information, that is, it is faster for a processor to read the smaller memory of a cache structure than to read a main memory.

As previously described, a cache structure is conceptually a matrix of S*W cache lines (conceptually cells) arranged in S sets (conceptually rows) and W ways (conceptually columns). The set (that is, the row) in which a piece of data is placed into cache is determined by the placement policy. The placement policy implements a hash function that uses certain bits of the memory address to map each particular memory line into a specific cache set (row). Since different memory lines can collide into the same cache set, cache sets consist of a given number of lines called ways (that is, columns). All sets have the same number of ways, which determine the associativity of the cache. Hence a W-way set-associative cache comprises W ways per set. For a given set, the way (cache line) in which a memory line is placed is determined by the replacement policy. On the event of a cache access that turns out to be a miss, the replacement policy selects, among all the ways (columns) in a given set (row), which memory line is evicted to make room for the new memory line. The new memory line is then stored in the cache line whose contents (a memory line) have been just evicted. Each line can be composed by one or several words. The granularity of a word is usually measured in bytes (e.g. 1, 2 or 4 bytes).

Figure 1:
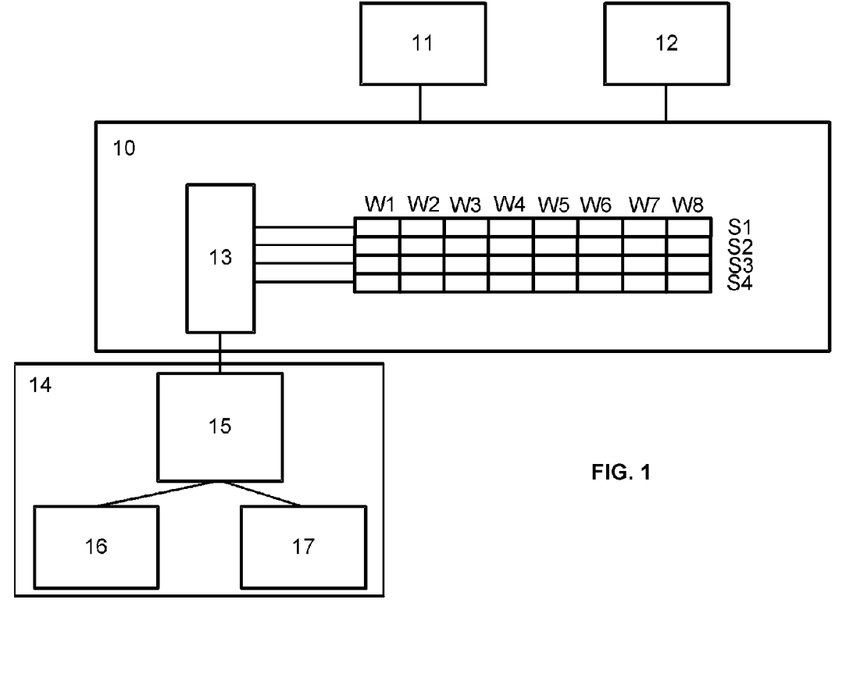
FIG. 1 schematically illustrates a processor setup deploying a cache structure, comprising a device for controlling the access to the cache structure according to an embodiment.

FIG. 1 illustrates a processor setup in which a cache structure 10 is deployed. The cache structure 10 comprising a plurality of ways W1-W8 and a plurality of sets S1-S4 (that is, a matrix of 4*8 cache lines). The cache structure 10 is coupled to a central processing unit (CPU) 11 and a main memory 12. Further, the cache structure 10 also comprises a set placement logic module 13 that determines which set of the cache sets S1-S4 is used to allocate a given address to access the main memory 12, issued from the CPU 11. The set placement logic module 13 receives the cache set identifier to access the cache structure 10 from a device 14 for controlling the access to the cache structure according to an embodiment.

The controlling device 14 comprises a parametric hash function module 15 that combines a seed value 16 generated by, for example, a pseudo-random number generator (not shown) and predetermined bits 17 of the given address to access the main memory 12.

At this point, it is important to note that the pseudo-random number generator may be implemented either in hardware or in software, although any other way to obtain the seed value is within the scope of the invention.

The disclosure also proposes updating the seed value 16 only at the beginning or the end of the execution of the computer program, although updating it at a different time, or with higher or lower frequency is also within the scope of the invention.

Consequently, if the seed value is changed, the obtained set identifier changes although the address remains the same.

Any parametric hash function module may be used as long as there is a real probability that an address may be mapped to any set. Any seed value may be used. However, PTA results are better (lower execution times) if the parametric hash function module produces large variations in its output set identifier even if small changes occur in the input address and/or the seed value, and if the seed is set to a random or pseudo-random value.

Further, the controlling device 14 can also comprise a register (not shown) for storing the generated seed value 16.

Figure 2:
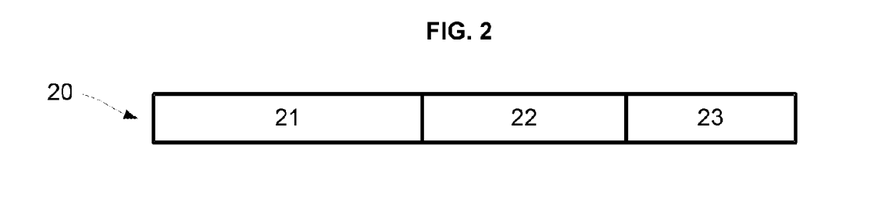
FIG. 2 schematically depicts an address register that contains a request to the cache structure for a specific address of a main memory given by a processor module associated to the cache structure.

FIG. 2 illustrates an example of an address 20 to access the main memory 12, issued from the CPU 11, predetermined bits 17 of which are combined with the seed value 16 for obtaining the cache set identifier to access the cache structure 10. Basically, the address 20 comprises three parts of bits:

A tag 21;
An index 22;
An offset 23.

As an illustrative example, if addresses are 16-bit wide and the cache line size is 64 bytes ($2^6$ bytes—in general, the number of bytes is $2^n$) then, for the cache structure shown in FIG. 1 (4 sets S1-S4, 8 ways W1-W8), the address bits are classified as follows: the 8 uppermost bits are the tag 21; the following 2 bits (that is, given that the cache comprises 4 sets it requires 2 bits for addressing all sets) are the index 22; and the 6 (that is "n") lowermost bits are the offset 23. In this way, if the address is "0011 0011 0100 0111" (in binary) the tag 21 is "0011 0011", the index 22 is "01", and the offset 23 is "00 0111".

Conventional placement policies use the index 22 ("01" in the example) to choose the cache set accessed by providing those bits to the set placement logic module 13. In the example, the set S1 is accessed if the index bits are "00"; the set S2 is accessed if the index bits are "01" (as in the example); the set S3 is accessed if the index bits are "10"; and the set S4 is accessed if the index bits are "11". Other placement policies are known that combine tag 21 and index 22 bits to generate a cache set identifier. However, clearly these placement policies are deterministic since the generated cache set identifier depends solely on the address accessed.

The device 14 according to an embodiment combines the bits of the tag 21 and the index 22 (that is, the predetermined bits 17 of the address 20) and the seed value 16 to generate a cache set identifier by means of the parametric hash function module 15.

Figure 3:
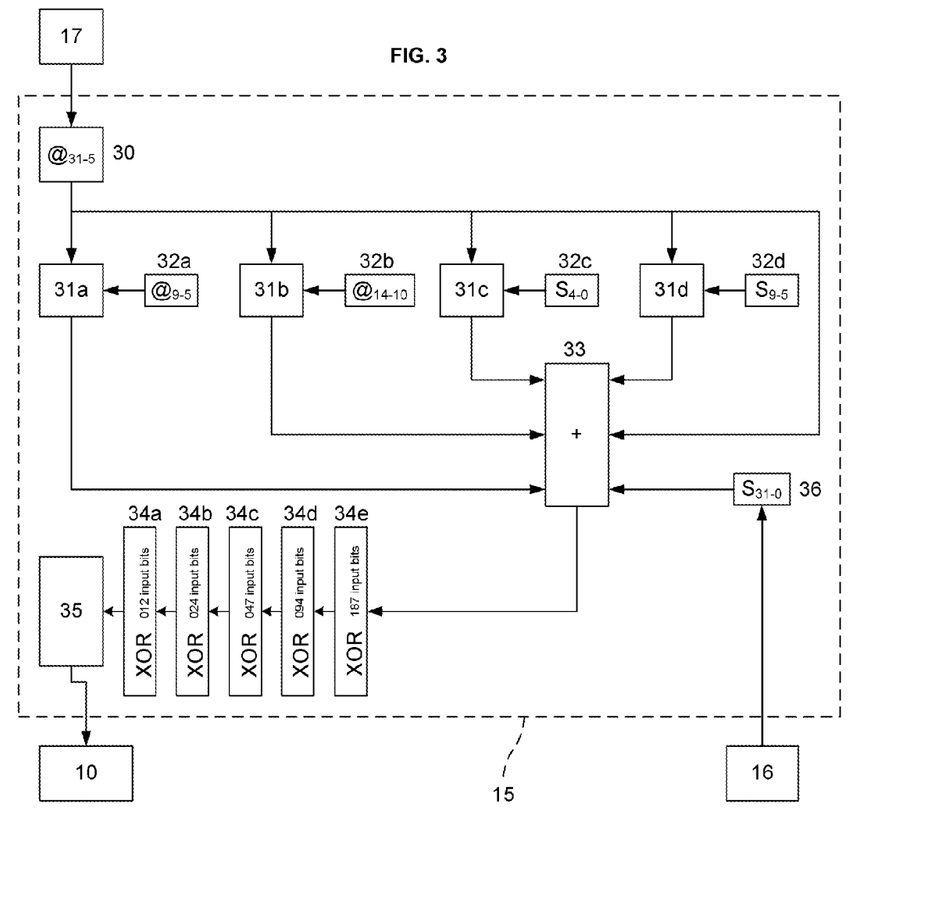
FIG. 3 illustrates a block diagram of an embodiment of a parametric hash function module comprised in the device for controlling the access to a cache structure shown in FIG. 1.

FIG. 3 shows an embodiment of a parametric hash function module 15. Obviously, the combination of the seed value 16 and the predetermined bits 17 of the address 20 (i.e. in the present embodiment, the tag 21 and the index 22) can be performed in different ways with the purpose of generating a cache set identifier to access the cache structure, whence the parametric hash function module 15 can have different settings.

In the embodiment shown in FIG. 3, the parametric hash function module 15 comprises a register 30 for receiving and storing the predetermined bits 17 of the address 20. Because in the present embodiment the address has 32 bits, the predetermined bits of the address are the bits 5 to 31 of the address (i.e. the address 20 without the offset 23).

Further, the parametric hash function module 15 also comprises a register 36 for receiving and storing the seed value 16 (in the present embodiment the seed value comprises 32 bits); a plurality of modules 31$a$,31$b$,31$c$,31$d$ for rotating the predetermined bits 17 of the address 20 based either on some bits 32$a$,32$b$,32$c$,32$d$ of the seed value 16 or some bits of the predetermined bits 17; a module 33 for concatenating the bits of the seed value 16, the predetermined bits 17 of the address

20, and the bits obtained in the output of each rotating module 31a,31b,31c,31d; and a plurality of XOR-folding logic modules 34a,34b,34c,34d,34e of different lengths for adapting the number of bits of the concatenated binary value to a binary value having as many bits as needed to index all cache sets. The output of the XOR-folding logic module 34a corresponds to the cache set identifier and it is received by a register 35, which provides the identifier to the set placement logic module 13 to access the cache structure 10 and to obtain or input data in the cache set. As described above, the set placement logic module 13 determines which set of the cache sets S1-S4 is used to allocate the given address 20.

Figure 4:
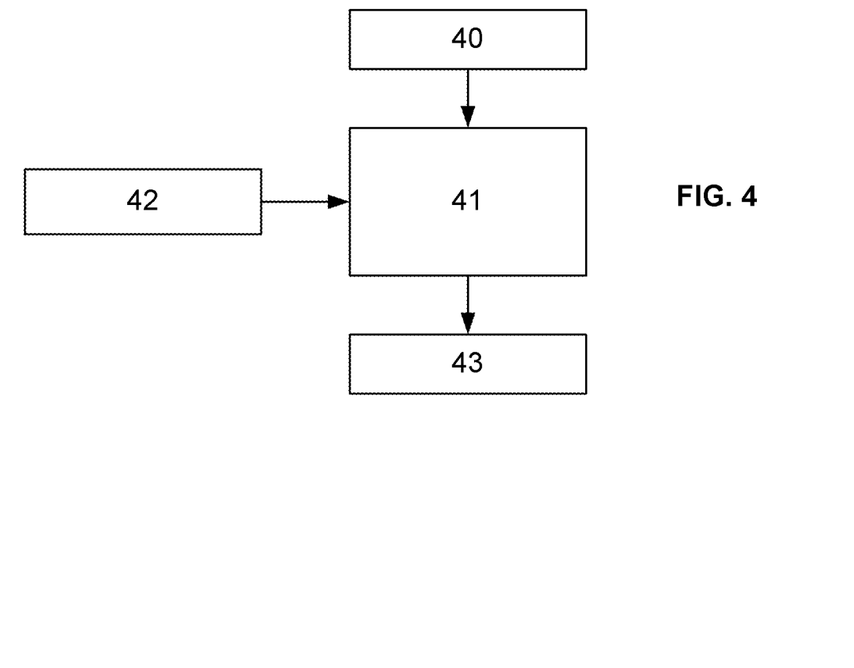
FIG. 4 illustrates a block diagram of a rotate module used in the parametric hash function module shown in FIG. 3.

Following, the operation of a rotating module 31a;31b; 31c;31d comprised in the parametric hash function module 15 shown in FIG. 3 is described from FIG. 4.

Basically, in the present embodiment, each rotating module comprises a rotate logic element 41 whose object is to rotate a binary value stored in a value register 40 to the left by N positions, where N is determined by a control register 42. The output of the rotate logic element 41 is received and stored in a register 43. Therefore, the N leftmost bits of the binary value in the value register 40 become the N rightmost bits of the output register 43 and the remaining M rightmost bits of the binary value in the value register 40 become the M leftmost bits of the output register 43. Although it is not a constraint, it is recommended that the number of bits of the binary value is a power of two (e.g. 2 bits, 4 bits, 8 bits, etc.) and the control register 42 has as many bits as the base-2 logarithm of the size of the binary value. For instance, if the binary value is 32-bits wide, the control register 42 should have 5 bits so that it can take 32 different values that can produce the 32 different rotations of the binary value (from 0 to 31 bit rotation).

The following example illustrates how a rotating module 31a;31b;31c;31d works. If the binary value is 00110111 (in binary) and the control register 42 is 101, then the output register 43 will be 11100110. The control register 42 makes the binary value to be rotated 5 (101 in binary) positions left so that the 5 leftmost bits of the binary value (00110) become the 5 rightmost bits of the binary value stored in the output register 43 and the remaining rightmost 3 bits of the binary value (111) become the 3 leftmost bits of the binary value stored in the output register 43.

Turning to FIG. 3, if this explanation is applied to the rotating modules shown in said figure, the correspondence is the following:

Rotating module 31a (which corresponds to the rotate logic element 41 of FIG. 4): the binary value comprises the bits 5 to 31 (i.e. the predetermined bits 17) of the address 20, which are stored in the address register 30 (it corresponds to the binary value register 40 of FIG. 4); the control register 32a corresponds to the control register 42 of FIG. 4, the control register 32a storing the bits 5 to 9 of the predetermined bits 17 of the address, which are also the bits 0 to 4 of the address register 30. The output of the rotating module 31a is sent to the concatenating module 33.

Rotating module 31b (which corresponds to the rotate logic element 41): the binary value also comprises the bits 5 to 31 (i.e. the predetermined bits 17) of the address 20, which are stored in the address register 30 (it corresponds to the binary value register 40 of FIG. 4); the control register 32b corresponds to the control register 42 of FIG. 4, the control register 32b storing the bits 10 to 14 of the predetermined bits 17 of the address, which are also the bits 5 to 9 of the address register 30. The output of the rotating module 31b is sent to the concatenating module 33.

Rotating module 31c (which corresponds to the rotate logic element 41): the binary value also comprises the bits 5 to 31 (i.e. the predetermined bits 17) of the address 20, which are stored in the address register 30 (it corresponds to the binary value register 40 of FIG. 4); the control register 32c corresponds to the control register 42 of FIG. 4, the control register 32c storing the bits 0 to 4 of the seed value 16. The output of the rotating module 31c is sent to the concatenating module 33.

Rotating module 31d (which corresponds to the rotate logic element 41): the binary value comprises the bits 5 to 31 (i.e. the predetermined bits 17) of the address 20, which are stored in the address register 30 (it corresponds to the binary value register 40 of FIG. 4); the control register 32d corresponds to the control register 42 of FIG. 4, the control register 32d storing the bits 5 to 9 of the seed value 16. The output of the rotating module 31d is sent to the concatenating module 33.

More specifically, one of the inputs for all rotating modules 31a,31b,31c,31d are the bits of the address 20 discarding offset bits 23. In the particular in the embodiment of FIG. 3, there are 5 offset bits and the address 20 is 32-bit wide, so 27 bits of the address are used. They are extended with 5 bits on the left, whose value is 00000, counting 32 bits in total. Each rotating module uses a different set of bits as a control register 32a;32b;32c;32d. These bits are used to determine how many positions the binary value (i.e. the predetermined bits 17 of the address 20 extended with 5 bits in the left whose value is 00000) is rotated. In FIG. 3, for example, the leftmost rotating module 31a uses the 5 lowermost bits of the address 20 after discarding the offset. In other words, it uses the 5 rightmost bits of the tag 21 and index 22 pair (bits in position 0, 1, 2, 3, 4 counting from right to left). The second leftmost rotating module 31b uses the next 5 lowermost bits of the tag 21 and index 22 pair (bits in position from 5 to 9). The other two rotating modules 31c,31d use bits from the seed value 16. In particular, they use bits 0 to 4 and bits 5 to 9, respectively.

In this way, the concatenating module 33 concatenates the bits 5 to 31 of the address 20, the bits 0 to 31 of the seed value 16, the output of the first rotating module 31a (i.e. 32 bits, which are the result of rotating the binary value comprising the predetermined bits 17 with 5 bits in the left whose value is 00000), the output of the second rotating module 31d (i.e. 32 bits) the output of the third rotating module 31c (i.e. 32 bits), and the output of the forth rotating module 31a (i.e. 32 bits), obtaining a single binary value of 187 bits (27+32+32+32+32+32=187 bits).

Then, several XOR modules 34a,34b,34c,34d,34e are applied in cascaded fashion to the output of the concatenating module 33 until the binary value has as many bits as needed to index all cache sets. Consequently, the XOR modules allow reducing the number of bits of the binary value until the binary value has as many bits as needed to index all cache sets.

Figure 5:
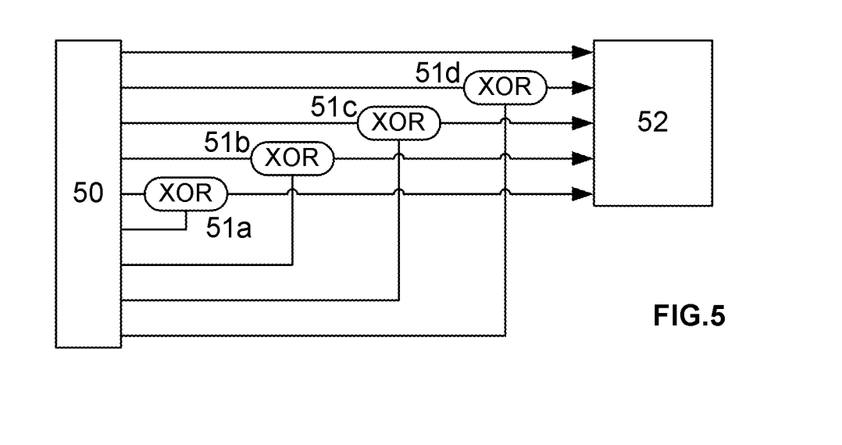
FIG. 5 illustrates a block diagram of a XOR module used in the parametric hash function module shown in FIG. 3.

The operation of a XOR module is described according to FIG. 5. As it can be seen in the figure, the XOR module is configured for the case in which the binary value has 9 bits though its functioning is the same regardless of the number of bits of the binary value used as input. Basically, the XOR module splits the bits of the binary value stored in a first register 50 into two halves and it carries out a XOR operation 51a,51b,51c,51d between each pair of bits in symmetric positions in each of the halves, i.e. XOR between bits 0 and 7, bits 1 and 6, bits 2 and 5; and bits 3 and 4. If the number of bits is odd, then the uppermost bit is simply propagated to the output (this is the case shown in FIG. 5). The XOR operation with 2 input bits produces a "1" if input bits differ (i.e. one of them is "0" and the other one is "1") and a "0" if they match (both of them are either "0" or "1"). The binary value obtained is stored in the output register 52.

For instance, if the binary value of the concatenation provided by the concatenating module 33 has 200 bits and the number of cache sets is 32, we must XOR those 200 bits until having only 5 bits to index all cache sets (5 is the base-2 logarithm of 32). Therefore, different levels of XOR modules will reduce the number of bits from 200 to 100, from 100 to 50, from 50 to 25, from 25 to 13, from 13 to 7, and from 7 to 5.

Note that whenever the number of bits of the input is lower than twice the number of bits required for the set index (e.g. 7 is lower than twice 5), the XOR logic is applied only for as many pairs of bits as the number of input bits (7 in the example) minus the number of output bits required (5 in the example), which means that is applied over 2 pair of bits. For that purpose, as many bits as needed are simply propagated from the left side of the input (3 bits in this case) and the remaining bits (4 bits in the example) are XOR-folded so that it is obtained as output those bits propagated (3 bits) and the output of XORing the pairs (2 bits).

Turning to FIG. 3, and taking into account the description done for FIG. 5, the first XOR module 34*e* receives a 187-bit binary value (as described above) from the concatenating module 33 and transforms it in a 94-bit binary value. The second XOR module 34*d* receives and transforms said 94-bit binary value into a 47-bit binary value. Said output value is received by the third XOR module 34*c*, which transforms the 47-bit binary value into a 24-bit binary value. Said 24-bit binary value is received by the fourth XOR module 34*b*, which transforms it into a 12-bit binary value. The 12-bit binary value is sent to the fifth XOR module 34*a* that transforms it into a value having as many bits as needed to index all cache sets of the cache structure. Once the appropriate value is obtained, it is stored in the output register 35, which provides the binary value to the set placement logic module 13 to access the cache structure 10.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

It is noted that adding bits to the input address without offset bits is recommended but not mandatory. Note that the number of bits used for the control register 42 of the rotating module 41 is set to be the base-2 logarithm of the size of the binary value register 40, but other number of bits could be used.

Note that any combination of address and seed bits could be used in any of the inputs of the rotating modules.

The invention is not limited to any of those decisions and any other parametric hash function module 15 using rotating modules, XOR modules or any other kind of logic fall within the scope of the invention as long as the inputs of the parametric hash function module includes the address and a seed.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A device for controlling access to a cache structure comprising multiple cache sets during execution of at least one computer program, the device comprising:
   A seed value generator that is configured to and generates one or more seed values during the execution of the at least one computer program;
   A parametric hash function generator that is configured to and generates a cache set identifier to access the cache structure, the parametric hash function generator having:
      (i) a first register to receive a seed value from the seed value generator;
      (ii) a second register to receive predetermined bits of an address;
      (iii) a logic to change the predetermined bits based either on the seed value or on some bits of the predetermined bits of an address;
      wherein the output of the logic:
         (a) corresponds to the cache set identifier used to access a main memory associated to the cache structure with a true probability that the generated cache set identifier is assigned to each of the cache sets of the cache structure; and
         (b) has a property that, for the predetermined bits of two addresses for which the result of the parametric hash function produces the same cache set identifier for a given seed value, the change produces different cache set identifiers for other seed values, preventing both addresses to systematically obtain identical cache set identifiers for all seeds;
      wherein the address comprises a sequence of bits having three parts, a first part of which corresponds to a tag, a second part corresponds to an index and a third part corresponds to an offset, and wherein the predetermined bits of the address comprises the first and the second part of the sequence of bits.

2. The device according to claim 1, wherein the cache structure comprises $2^n$ sets, and wherein the generated cache set identifier comprises n bits.

3. The device according to claim 1, wherein the cache structure comprises at least one cache line per set.

4. The device according to claim 1, wherein the seed value generator comprises a pseudo-random number generator.

5. The device according to claim 1, further comprises a memory module for storing the generated seed values.

6. A method of controlling access to a cache structure comprising multiple cache sets during the execution of at least one computer program, the method comprising:
   Generating one or more seed values during the execution of the at least one computer program;

Receiving an address to access a main memory associated to the cache structure;

Generating a cache set identifier to access the cache structure, the cache set identifier being generated by combining a generated seed value and predetermined bits of the received address;

wherein the generating includes:
receiving a seed value from the generating of the one or more seed values;
receiving predetermined bits of an address:
changing the predetermined bits based either on the seed value or on some one or more bits of the predetermined bits of an address:
wherein the output of the changing:
(a) corresponds to the cache set identifier used to access a main memory associated to the cache structure with a true probability that the generated cache set identifier is assigned to each of the cache sets of the cache structure; and
(b) has a property that, for the predetermined bits of two addresses for which the result of the generating a cache set identifier produces the same cache set identifier for a given seed value, the change produces different cache set identifiers for other seed values, preventing both addresses to systematically obtain identical cache set identifiers for all seeds;

wherein the address comprises a sequence of bits having three parts, a first part of which corresponds to a tag, a second part corresponds to an index and a third part corresponds to an offset, and wherein the predetermined bits of the address comprises the first and the second part of the sequence of bits.

7. Computer program product comprising program instructions for causing a computer to perform a method of controlling the access to a cache structure comprising multiple cache sets according to claim 6.

8. Computer program product according to claim 7, embodied on a storage medium.

9. A cache structure comprising:
multiple cache sets; and
a device for controlling access to the cache structure during the execution of at least one computer program, the device comprising
a seed value generator configured to generate one or more seed values during the execution of the at least one computer program;
a parametric hash function generator configured to generate a cache set identifier to access the cache structure, the parametric hash function generator having:
(i) a first register to receive a seed value from the seed value generator;
(ii) a second register to receive predetermined bits of an address;
(iii) a logic to change the predetermined bits based either on the seed value or on some bits of the predetermined bits of an address;
wherein the output of the logic:
(a) corresponds to the cache set identifier used to access a main memory associated to the cache structure with a true probability that the generated cache set identifier is assigned to each of the cache sets of the cache structure; and
(b) has a property that, for the predetermined bits of two addresses for which the result of the parametric hash function produces the same cache set identifier for a given seed value, the change produces different cache set identifiers for other seed values, preventing both addresses to systematically obtain identical cache set identifiers for all seeds;
wherein the address comprises a sequence of bits having three parts, a first part of which corresponds to a tag, a second part corresponds to an index and a third part corresponds to an offset, and wherein the predetermined bits of the address comprises the first and the second part of the sequence of bits.

10. The cache structure according to claim 9, wherein the cache structure comprises $2^n$ sets, and wherein the generated cache set identifier comprises n bits.

11. The cache structure according to claim 1, wherein the cache structure comprises at least one cache line per set.

12. The cache structure according to claim 1, wherein the seed value generator comprises a pseudo-random number generator.

13. The cache structure according to claim 1, further comprising a memory module for storing the generated seed values.

* * * * *